United States Patent [19]

Schutten et al.

[11] Patent Number: 4,538,642
[45] Date of Patent: Sep. 3, 1985

[54] FAST ACTING VALVE

[75] Inventors: Herman P. Schutten, Milwaukee, Wis.; Lyle O. Hoppie, Birmingham, Mich.; David Turner, Bloomfield Hills, Mich.; Richard Chute, Birmingham, Mich.

[73] Assignee: Eaton Corporation, Cleveland, Ohio

[21] Appl. No.: 602,338

[22] Filed: Apr. 20, 1984

[51] Int. Cl.³ .......................... F16K 7/12; F16K 31/02
[52] U.S. Cl. .......................... 137/625.28; 137/625.33; 251/129.15
[58] Field of Search .................. 137/625.28, 625.33; 251/129

[56] References Cited

U.S. PATENT DOCUMENTS 3,853,268 12/1974 Schneider .................. 137/625.33 X
4,158,368 6/1979 Clark .................. 251/129

OTHER PUBLICATIONS

NASA Tech. Brief 67-10638, Dec. 1967.

Primary Examiner—Arnold Rosenthal
Attorney, Agent, or Firm—Andrus, Sceales, Starke & Sawall

[57] ABSTRACT

A fast acting mechanical valve (2) affords macroeffects with high speed, low mass, micromovement. A first microporous planar sheet-like electrically conductive film (4) has an electrically insulative face surface (6), and an array of microapertures (7-11) through the film and face surface. A second microporous planar sheet-like electrically conductive film (12) abuts the insulative face surface and has an array of microapertures (13-16) therethrough nonaligned with the first array. An electric circuit (26, 28 and 30) supplies electric current flow through the parallel films to effect relative transverse movement therebetween due to interacting electromagnetic fields, for actuating the valve between closed and open positions.

7 Claims, 4 Drawing Figures

FAST ACTING VALVE

BACKGROUND AND SUMMARY

The present invention relates to a fast acting mechanical valve, and more particularly to a valve which can open up a relatively large area within a relatively short time, such as microseconds.

In various applications, it may be desirable to open up large areas within short times against high pressures. For example, in an automotive application it may be desirable to open an intake or exhaust valve on an arbitrary selective basis, i.e. upon command, rather than by means of a crankshaft connection or the like. For such applications, it may be necessary to have actuation times lesss than about one hundred microseconds to open up a square inch of area against pressures up to about six hundred pounds per square inch. This is an enormous amount of work to do within a very short time span, and is not feasible with conventional concepts where a large mass must be moved a relatively large distance to achieve the valve opening.

The present invention provides a simple fast acting mechanical valve offering extremely high speed and only microdisplacement of a low mass, yet opening macroareas against high pressures. Macroeffects are provided using microporosity in combination with micro-movement.

DETAILED DESCRIPTION

Figure 1:
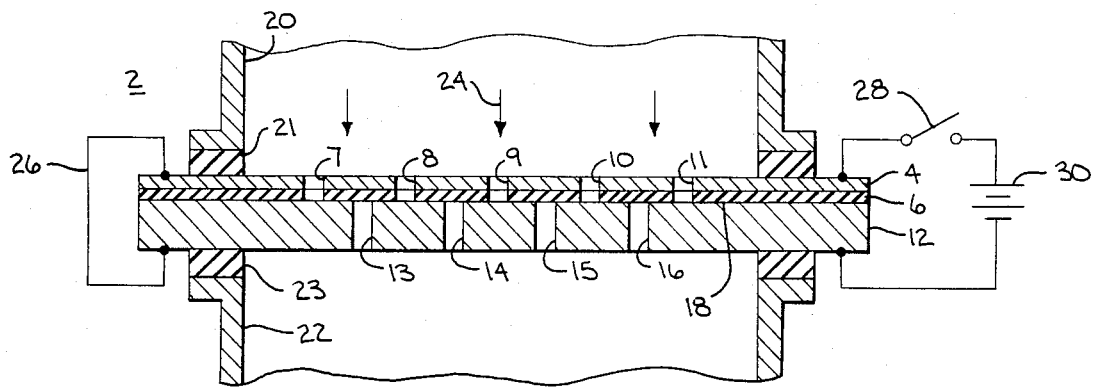
FIG. 1 is a sectional schematic illustration of a fast acting valve in accordance with the invention.

There is shown in FIG. 1 a fast acting mechanical valve 2 affording macroeffects with high speed, low mass, micromovement. A first microporous planar electrically conductive sheet-like member or film 4 includes an electrically insulative face surface 6 on one side thereof, and an array of microapertures such as 7-11 through the film and the face surface. A second microporous planar electrically conductive sheet-like member or film 12 abuts the first member at insulative face surface 6 on the opposite side thereof from first film 4, and has an array of microapertures such as 13-16 therethrough nonaligned with the first array 7-11.

Figure 2:
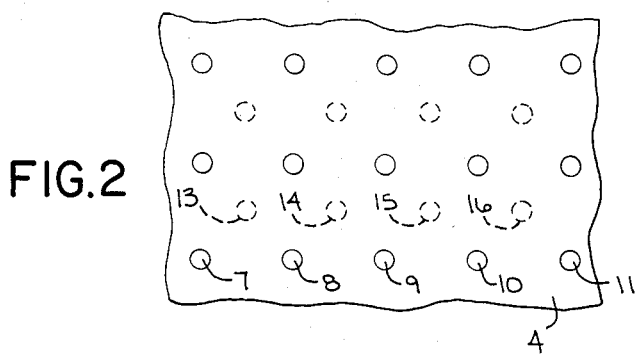
FIG. 2 is a top view of the structure in FIG. 1.

In the closed position of the valve shown in FIG. 1, films 4 and 12 abut insulative face surface 6, with aperture array 7-11 nonaligned with aperture array 13-16. The interface 18 between the films at insulative face surface 6 provides a seal which blocks fluid flow from upper conduit 20 to lower conduit 22. These conduits are mounted to the top and bottom surfaces of the valve along a circumferential perimeter by respective electrically insulating annular sealing gasket means 21 and 23. The fluid such as shown at arrow 24 may be gaseous or liquid. Aperture array 7-11 is further shown in the partial top view in FIG. 2, and aperture array 13-16 is shown in dashed line. In the embodiment shown, the apertures are about one hundred microns in diameter and are spaced on center by about three hundred microns.

Means are provided for effecting relative movement between the first and second sheet-like members to open passages through the microapertures allowing transverse fluid flow through the sheet-like members. Electric circuit means is provided for controlling electric current flow through films 4 and 12 to effect relative transverse movement therebetween, FIG. 3, due to interacting electromagnetic fields. A conductor 26 ohmically connects films 4 and 12 at their left end. The right end of film 4 is connected through a switch 28 to the positive terminal of a voltage source such as battery 30. The right end of film 12 is connected to the negative terminal of the voltage source. In the embodiment shown, film 4 is a flexible layer of aluminum, insulative face surface 6 is aluminum oxide, and film 12 is an aluminum or the like substrate which is substantially rigid relative to film 4.

Upon closure of switch 28, electric current passes leftwardly through film 4, then through conductor 26, and then rightwardly through film 12. This current flow in opposite directions through the parallel films drives them transversely apart due to opposing electromagnetic fields, to break interface seal 18. This allows fluid flow passage through the first and second arrays of apertures 7-11 and 13-16 and through the space 32 between the transversely separated films, as shown by the fluid flow arrows such as 24 in FIG. 3.

Figure 3:
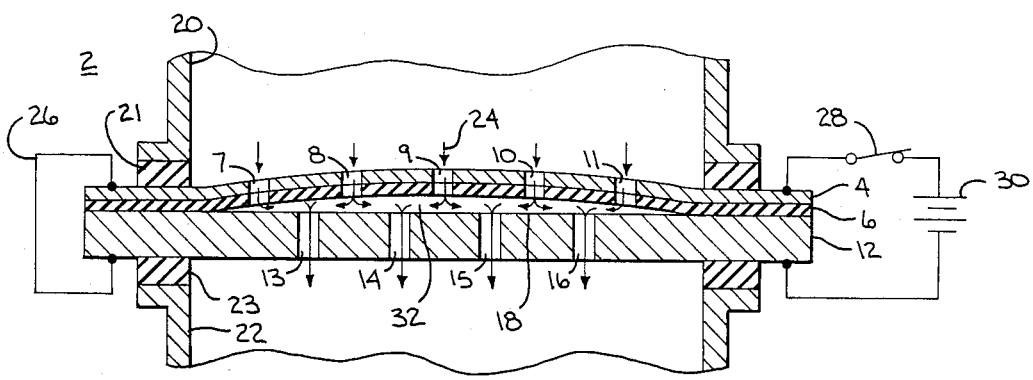
FIG. 3 is a view like FIG. 1 but showing the valve in an open position.

In the open position of the valve in the embodiment shown in FIG. 3, film 4 bows upwardly through a transverse travel movement of about one hundred microns and opens up a lateral area of about one square inch across the planar face of the valve. This opening is accomplished in less than about one hundred microseconds against pressures up to about six hundred pounds per square inch. Gaseous or liquid fluid may then flow from upper conduit 20 to lower conduit 22 or vice versa.

Figure 4:
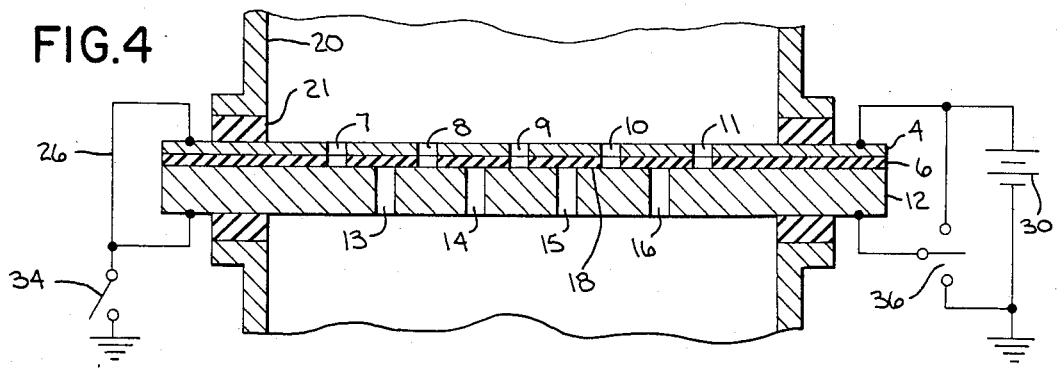
FIG. 4 shows an alternate embodiment of FIG. 1.

In an alternate embodiment shown in FIG. 4, conductor 26 is connectable through switch 34 to a given reference potential or ground. A switch 36 has a central open position, an upper closed position connecting film 12 together with film 4 to the positive terminal of battery 30, and a lower closed position connecting film 12 instead to the negative terminal of the battery which is grounded or connected to the noted reference potential. With switch 34 in its leftward open position, the valve in FIG. 4 operates as in FIGS. 1 and 3, with the open and closed positions of switch 28 corresponding to the central open and downwardly closed positions of switch 36. In this mode, the valve of FIG. 4 is normally closed as shown in FIG. 1, and is actuated to an open condition as shown in FIG. 3.

In an alternate configuration, switch 34 is in its downward closed position, and switch 36 is actuated between its central open position and its upward closed position. In this mode, the valve of FIG. 4 is normally open, and film 4 is normally upwardly bowed in the absence of electromagnetic force thereon. Upon closure of switch 36 to its upward position, current flows from battery 30 leftwardly through film 4 and leftwardly through film 12 in parallel therewith, then to conductor 26 and aground. The electric current in the films through the same direction drives them transversely toward each other, due to commonly directed electromagnetic fields, to the closed position shown in FIG. 1.

In a further alternative, electric current is applied through the films both to open and to close the valve. In a closed position of the valve, switch 34 is closed and switch 36 is closed upwardly, to apply current through parallel films 4 and 12 in the same direction, causing mutual attraction thereof to provide the noted interface seal at 18. In the open position, switch 34 is open and switch 36 is closed downwardly, such that current flows through films 4 and 12 in opposite directions, to drive the films apart, breaking interface seal 18 and opening space 32.

It is recognized that various modifications are possible within the scope of the appended claims.

We claim:

1. A fast acting mechanical valve, comprising:
a first planar sheet-like electrically conductive film having an electrically insulative face surface on one side thereof, and an array of apertures through said film and face surface;
a second planar sheet-like electrically conductive film abutting said insulative face surface on the opposite side thereof from said first film, and having an array of apertures through said second film nonaligned with said first mentioned array; and
means for effecting relative movement between said films to open passages through said apertures allowing transverse fluid flow through said films, wherein said last mentioned means comprises electric circuit means for supplying electric current flow through said first and second films to effect relative transverse movement therebetween due to interacting electromagnetic fields.

2. The invention according to claim 1 wherein:
said valve is normally closed, with said first and second films abutting said insulative face surface and said first and second arrays nonaligned, the interface between said first and second films at said insulative face surface providing a seal which blocks fluid flow; and
said valve has an open position wherein said electric circuit means passes current through said first and second films in opposite directions to drive them transversely appart due to opposing electromagnetic fields to break said interface seal and allow fluid flow passage through said first and second arrays of apertures and through the space between said transversely separated films.

3. The invention according to claim 1 wherein:
said valve is normally open, with said first and second films transversely spaced and separated and allowing fluid flow passage through said first and second arrays of apertures and through the space between said transversely separated films; and
said valve has a closed position wherein said electric circuit means passes current through said first and second films in the same direction to drive them transversely towards each other due to commonly directed electromagnetic fields to abut each other at said insulative face surface, with said first and second arrays nonaligned, the interface between said first and second films at said insulative face surface providing a seal which blocks fluid flow.

4. The invention according to claim 1 wherein:
said valve has a closed position wherein said electric circuit means passes current through said first and second films in the same direction to drive them transversely toward each other due to commonly directed electromagnetic fields such that said first and second films abut said insulative face surface, with said first and second arrays nonaligned, the interface between said first and second films at said insulative face surface providing a seal which blocks fluid flow; and
said valve has an open position wherein said electric circuit means passes current through said first and second films in opposite directions to drive them transversely apart due to opposing electromagnetic fields to break said interface seal and allow fluid flow passage through said first and second arrays of apertures and through the space between said transversely separated films.

5. A fast acting mechanical valve affording macroeffects with high speed, low mass, micromovement, comprising:
a first microporous planar sheet-like electrically conductive film having an electrically insulative face surface on one side thereof and an array of microapertures through said film and face surface;
a second microporous planar sheet-like electrically conductive film abutting said insulative face surface on the opposite side thereof from said first film, and having an array of microapertures through said second film nonaligned with said first mentioned array, the interface between said first and second films at said insulative face surface providing a seal which blocks fluid flow; and
electric circuit means for passing electric current through said first and second films in opposite directions to drive them transversely apart due to opposing electromagnetic fields to break said interface seal and allow fluid flow passage through said first and second arrays of microapertures and through the space between said transversely separated films.

6. The invention according to claim 5 wherein:
said first film comprises a flexible aluminum layer;
said insulative face surface comprises aluminum oxide;
said second film comprises a substrate substantially rigid relative to said aluminum layer such that the latter bows away from said substrate when said electric current passes oppositely therethrough;
the transverse movement of said aluminum layer is in the range up to about one hundred microns and opens up a lateral area in the range up to about one square inch within a time range up to about one hundred microseconds against pressures in the range up to about six hundred pounds per square inch.

7. The invention according to claim 5 wherein said microapertures are about one hundred microns in diameter and are spaced on center by about three hundred microns.

* * * * *